United States Patent
Mosconi et al.

(10) Patent No.: US 7,581,658 B2
(45) Date of Patent: Sep. 1, 2009

(54) CAPSULE FEEDING APPARATUS FOR BEVERAGE VENDING MACHINE

(75) Inventors: Claudio Mosconi, Bergamo (IT); Silvano Personeni, Bergamo (IT)

(73) Assignee: N & W Global Vending S.p.A., Bergamo (IT)

( * ) Notice: Subject to any disclaimer, the term of this patent is extended or adjusted under 35 U.S.C. 154(b) by 519 days.

(21) Appl. No.: 10/536,018

(22) PCT Filed: Sep. 23, 2003

(86) PCT No.: PCT/EP03/10563

§ 371 (c)(1),
(2), (4) Date: Nov. 22, 2005

(87) PCT Pub. No.: WO2004/045350

PCT Pub. Date: Jun. 3, 2004

(65) Prior Publication Data

US 2006/0124659 A1      Jun. 15, 2006

(30) Foreign Application Priority Data

Nov. 21, 2002   (IT)   .................... PN2002A0090

(51) Int. Cl.
*B65G 47/14*  (2006.01)
*A47J 31/40*  (2006.01)
(52) U.S. Cl. ............... 221/161; 221/156; 221/163; 221/167; 221/169; 99/275
(58) Field of Classification Search ......... 221/1–312 C; 700/231–244; 99/275, 302 C
See application file for complete search history.

(56) References Cited

U.S. PATENT DOCUMENTS

| | | | | |
|---|---|---|---|---|
| 3,295,998 A | * | 1/1967 | Goros | ........................ 99/282 |
| 5,400,699 A | * | 3/1995 | Cailbault | .................... 99/357 |
| 5,520,093 A | * | 5/1996 | Ackermann | .............. 99/289 T |
| 6,240,832 B1 | * | 6/2001 | Schmed et al. | ........... 99/289 R |
| 6,510,783 B1 | * | 1/2003 | Basile et al. | .............. 99/289 R |
| 6,539,686 B1 | * | 4/2003 | Trebbi | ........................... 53/53 |

(Continued)

FOREIGN PATENT DOCUMENTS

EP          1 089 240 A2     4/2001

(Continued)

*Primary Examiner*—Gene Crawford
*Assistant Examiner*—Michael K Collins
(74) *Attorney, Agent, or Firm*—Wenderoth, Lind & Ponack, L.L.P.

(57) ABSTRACT

An apparatus (1) is provided for feeding capsules (4), preferably single-use capsules for the preparation of beverages, infusions and the like, for beverage vending machines. The apparatus includes a storage chamber (2, 22) for storing capsules (4) in a random arrangement, pick-up means (10, 210) for picking up the capsules (4), a capsule transfer device (13, 213) provided with one or more compartments (14, 214) for the capsules (4), at least an unloading conveyor (19, 219) for unloading the capsules (4). The apparatus is characterized in that, between the storage chamber (2, 22) and the at least an unloading conveyor (19, 219), the apparatus (1) comprises a first orientating device (8, 28), which is adapted to orientate the capsules (4) according to at least a substantially horizontal-axis position, and a second orientating device (20, 220) which is adapted to arrange the capsules (4) according to a same vertical-axis position.

22 Claims, 5 Drawing Sheets

U.S. PATENT DOCUMENTS

| | | | |
|---|---|---|---|
| 6,584,888 B2 * | 7/2003 | Cortese | 99/289 R |
| 6,595,106 B2 * | 7/2003 | Eugster | 99/289 R |
| 6,820,535 B2 * | 11/2004 | Fischer | 99/289 R |
| 6,857,352 B2 * | 2/2005 | Fischer | 99/280 |
| 6,941,855 B2 * | 9/2005 | Denisart et al. | 99/289 R |
| 7,210,507 B2 * | 5/2007 | Facchini | 141/146 |
| 7,231,279 B2 * | 6/2007 | Ghidotti | 700/239 |
| 7,487,713 B2 * | 2/2009 | Magno | 99/302 P |
| 2007/0144355 A1 * | 6/2007 | Denisart et al. | 99/275 |

FOREIGN PATENT DOCUMENTS

| | | |
|---|---|---|
| GB | 603818 | 6/1948 |
| WO | 02/078499 | 10/2002 |

* cited by examiner

CAPSULE FEEDING APPARATUS FOR BEVERAGE VENDING MACHINE

BACKGROUND OF THE INVENTION

1. Field of the Invention

The present invention refers to an apparatus for feeding capsules, in particular single-use capsules for the preparation of beverages, infusions and the like, for beverage vending machines.

2. Description of Related Art

In the following description, the term "capsule" is used to mean shells or envelopes in the shape of a cylinder or a frustum of cone, provided with an annular edge.

At the present time, due to a number of hygienic, convenience and efficiency reasons, the use is spreading rapidly in beverage vending machines of so-called pre-packed, ready-to-use, single-portion disposable capsules, which contain a liquid or solid mixture for the preparation of hot and/or cold beverages, such as coffee, tea, infusions, tisanes and the like.

In the practical operation of the beverage vending machines that make use of such single-use capsules, the need arises for the capsules to be withdrawn one at a time from the compartment in which they are stored, and to be then conveyed towards the brewing unit which, upon having gained access to the contents of the capsule, goes through the beverage preparation process. Since these capsules generally are in a not fully symmetrical shape, or have one or more preferential opening directions, it is a largely known fact that their arrangement in the storage compartments provided in the vending machine must be carried out in such a manner as to ensure that the capsules are since the beginning already suitably oriented in view of the conveyance and beverage preparation operations that have to take place subsequently. In currently used vending machines, the conveyance systems used for such single-use capsules require that these be stored inside the machine in the form of suitably pre-arranged stacks, i.e. stacks that are pre-packed and ready for loading as such into the appropriate storage compartment in the vending machine. It can be readily appreciated that these stacks of capsules must actually be specially pre-packed not only according to a particular preferential orientation, but also by keeping the dimensions of the storage compartment available in the particular model of vending machine into due account. When the single-use capsules are not available in the form of pre-packed stacks, or when the feeding apparatus does not allow for such stacks to be used, the capsule stacking procedure must be completed manually on the spot by the servicing operators themselves, under corresponding lengthening of the time required for completing the servicing operations for replenishing the vending machine. Furthermore, this makes it quite likely that errors are made in positioning the capsules, which could cause the vending machine to get jammed and, as a result, the owner of the vending installation suffers an economic loss.

SUMMARY OF THE INVENTION

It therefore is the object of the present invention to provide a capsule feeding apparatus, in particular for feeding single-use capsules for the preparation of beverages, infusions and the like, for beverage machines, which does away with the drawbacks and the disadvantages of prior-art capsule conveyance systems.

Within this general object, it is a purpose of the present invention to provide a capsule feeding apparatus for beverage vending machines, which enables capsules to be picked up, conveyed and oriented automatically, which have been stored in a compartment loosely, i.e. in no pre-established order.

Another purpose of the present invention is to provide a capsule feeding apparatus for beverage vending machines, which is capable of effectively performing such a picking up, conveyance and orientation of the capsules within an extremely reduced space.

Another purpose of the present invention is to provide a capsule feeding apparatus for beverage vending machines, which is low in its space requirements, i.e. compact in its construction.

It is a further purpose of the present invention to provide a capsule feeding apparatus for beverage vending machines, which allows for capsules to be withdrawn in a discontinuous manner from a compartment in which they are oriented randomly, and to be then conveyed in a continuous manner, and with a pre-established orientation, towards at least an unloading conveyor.

A further purpose of the present invention is to provide a capsule feeding apparatus for beverage vending machines, which enables the procedure needed to fill the capsules into the storage chamber thereof to be simplified, without requiring any particular pre-orientation operation to be performed.

Still another purpose of the present invention is to provide a capsule feeding apparatus for beverage vending machines, which does not allow for any kind of errors in the orientation of the capsules.

Finally, an equally important purpose of the present invention is to provide a capsule feeding apparatus for beverage vending machines, which is capable of picking, conveying and orienting the capsules by making use of the force of gravity.

According to the present invention, these aims are reached in a capsule feeding apparatus for beverage vending machines incorporating the features and characteristics described herein.

BRIEF DESCRIPTION OF THE DRAWINGS

Features and advantages of the present invention will be more readily understood from the description that is given below by way of non-limiting example with reference to the accompanying drawings, in which.

DETAILED DESCRIPTION OF THE INVENTION

Figure 1:
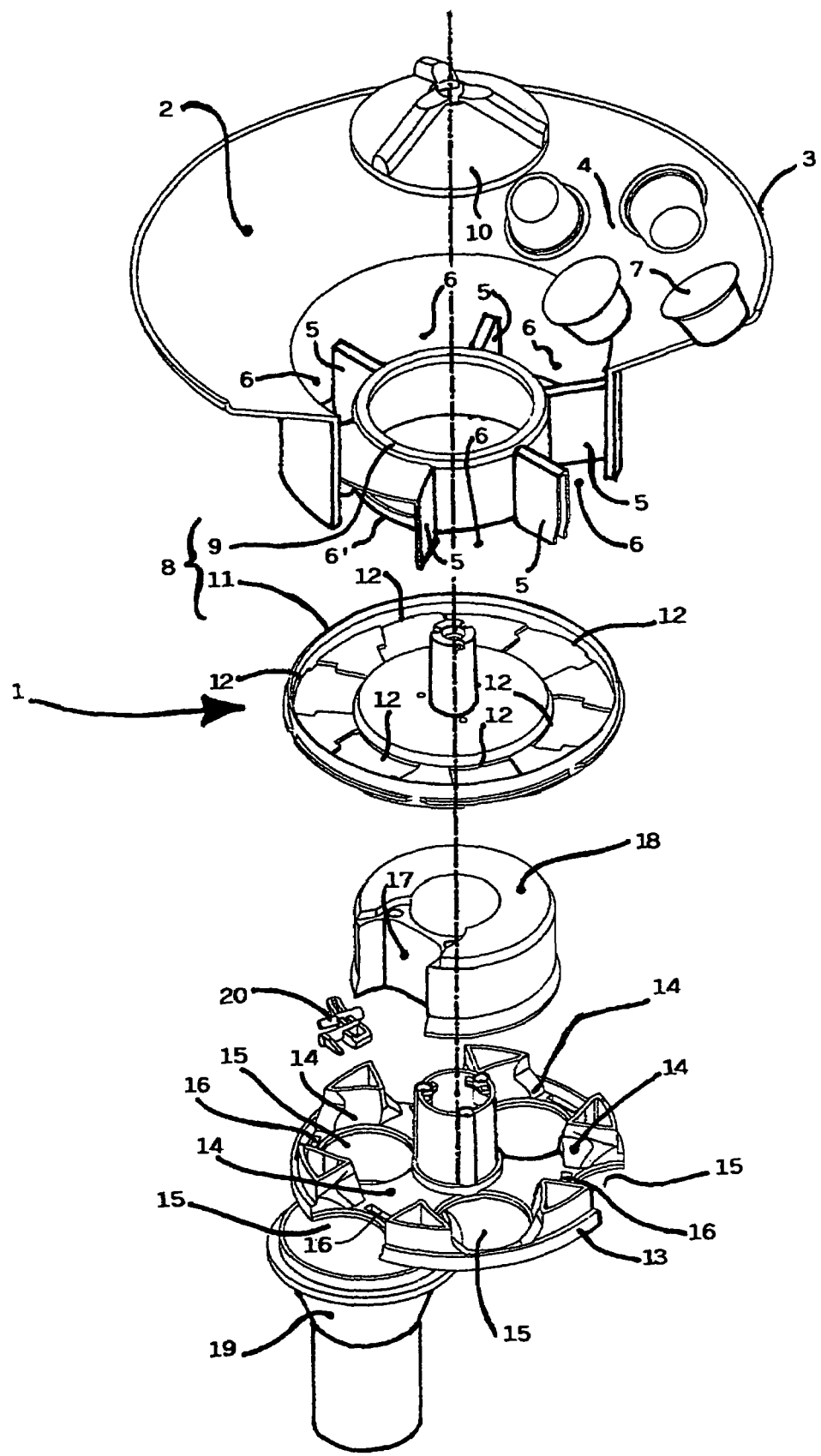
FIG. 1 is a perspective exploded view of a first embodiment of the capsule feeding apparatus for beverage vending machines according to the present invention.

FIG. 1 illustrates a first embodiment of the capsule feeding apparatus 1 for beverage vending machines according to the present invention. This first embodiment of the apparatus comprises a storage chamber 2 comprised between conveying means 3 that are preferably constituted by a hopper being preferably circular in its cross-section. Inside said storage chamber 2 there are stored the capsules 4, in which said capsules are preferably single-use capsules for the preparation of beverages, infusions and the like. The manner in which the capsules 4 come to be arranged in the chamber 2 is by all means casual, no particular scheme or method being actually required, according to the present invention, for filling and arranging the capsules in the chamber 2. In view of favoring the downward conveyance of the capsules 4 contained in the storage chamber 2, the apparatus 1 comprises pick-up means 10, which are preferably constituted by a moving conical member driven, for instance, by an electric motor (not shown). The movements that said pick-up means 10 are capable of performing are, for instance, vibratory, translatory, rotary, reciprocating motions or any combination thereof. The action of said means 10 favors the storage chamber 2 to be emptied in such a manner as to ensure that the capsules 4 that have first been loaded in the chamber are actually the first ones to be conveyed downwards.

Close to the lower portion of the conveying means 3 there is arranged a first orientating device 8, which enables the capsules 4 to be arranged in such a posture as to cause the longitudinal axis thereof to become substantially horizontal. Said first orientating device 8 is constituted by a first member 9 and a second member 11. Said first member 9 is advantageously provided with dividing elements 5 which, owing to their disposition, define a plurality of open cavities 6, each one of which is able to accommodate one or more capsules 4. One of these cavities, as indicated at 6' in FIG. 1, is blind and the capsules 4 have no possibility of reaching into it. The purpose to which such a blind cavity 6' is provided will be apparent from the description that is given further below.

The cavities 6 are substantially sized so as to ensure that the capsules 4 are able to only enter them in one of a limited number of possible orientations, and in particular in an orientation that would certainly enable the longitudinal axis thereof to take a substantially horizontal position. In the embodiment illustrated in FIG. 1, the dividing elements 5 are constituted by a plurality of partitions provided inside a hopper that acts as the conveying means 3. In the example illustrated in FIG. 1, the cavities 6 are obtained by arranging the above-cited partitions in radial directions so as to define sectors of a circle, which are only accessible to the capsules 4 when said capsules are arranged with the upper surface 7 thereof turned in a position facing the longitudinal axis of the apparatus 1 or opposite thereto. The upper surface 7 is the one near which the annular edge, i.e. the rim of the capsule comes to lie.

The second member 11 which the orientating device 8 is comprised of, is a moving one and comprises a plurality of first apertures 12 that replicate the peripheral shape of at least a section of the capsules 4. In this manner, due to the effect of the force of gravity and the agitation brought about by the pick-up means 10, the capsules 4 leave the cavities 6 of the first member 9 and interact with the second member 11 and, in particular, the first apertures 12 thereof. Depending on the shapes replicated by said first apertures 12 and the distribution thereof in the second member 11, the latter, with its motion, organizes the spatial arrangement of the capsules 4 coming from the cavities 6. The second member 11 preferably acts on more than a single one of said capsules. The capsules 4 pass through the first apertures 12 solely in the case that their conformation and their orientation agree with the ones that are replicated by each one of said first apertures 12. Said first apertures 12 are preferably arranged alternately with an orientation that varies from each other. FIG. 1 can be noticed to illustrate a second member 11 and a possible arrangement of the first apertures 12 thereof that corresponds to what has been described above. It should be specially stressed that the number of the orientations replicated by the peripheral shapes of the first apertures 12 is equal to the number of the possible orientations that the capsules 4 can have for them to be able to enter the cavities 6. The movement that the second member 11 may perform is preferably, although not solely, a rotary motion about the longitudinal axis of the apparatus 1.

In a position located below the first orientating device 8, the apparatus 1 according to the present invention comprises a moving transfer device 13, which is provided with one or more compartments 14 receiving and accommodating the capsules 4 as oriented and arranged in an organized manner by the first orientating device 8. Said compartments 14 are provided in a position facing the first apertures 12. Such a position remains always constant, since the motion performed by the transfer device 13 is a synchronous, and preferably rotary, one relative to the motion performed by the second member 11. The transfer device 13 is preferably driven independently of the pick-up means 10; if desired, however, these two items may also be driven by the same means.

Figure 3:
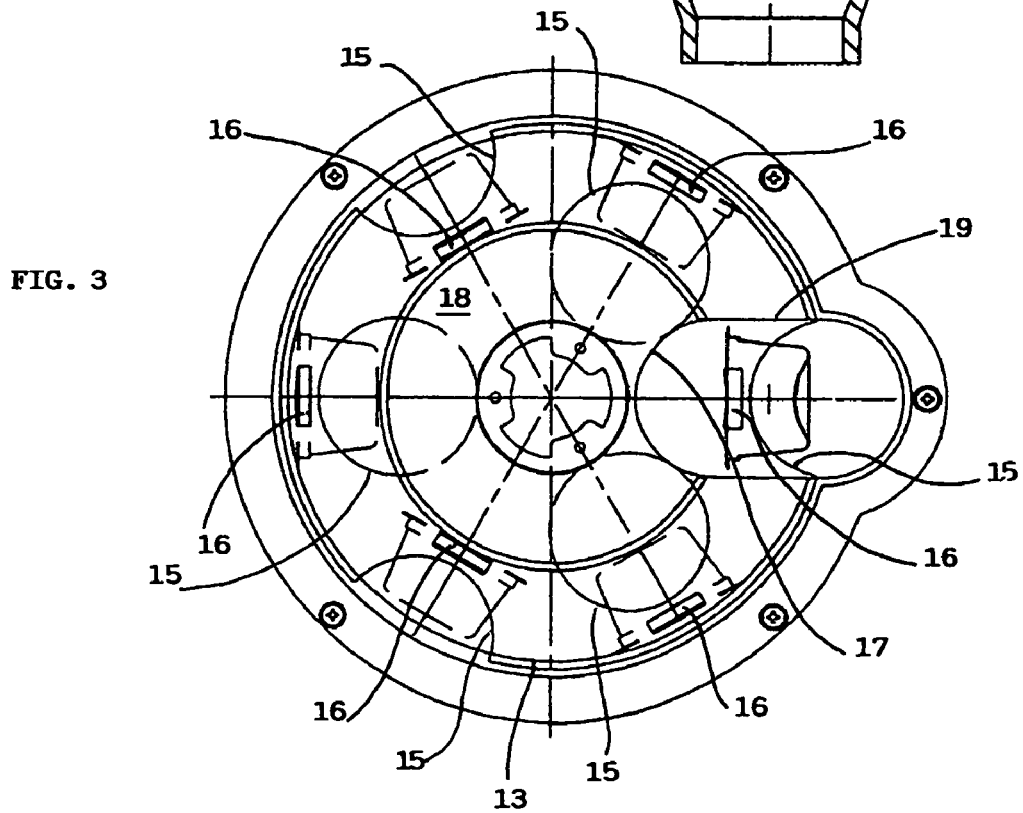
FIG. 3 is a top plan view of the capsule displacement device and the unloading conveyor of the apparatus shown in FIGS. 1 and 2.

As can be clearly seen in FIG. 1, the transfer device 13 is preferably comprised of a plate in a substantially circular shape. The compartments 14 include stop means 16 that enable the movements of the capsules 4 to be appropriately limited, when the latter, as pushed by the force of gravity, pass through the first apertures 12 and drop into accommodation in the compartments 14. As best illustrated in FIGS. 1 and 3, the stop means 16 may advantageously be constituted by appropriate slots, which are able to be engaged by at least a portion of each one of said capsules 4. It will anyway be readily appreciated that the stop means 16 may also be implemented according to other known configurations, as far as they still prove effective in interacting with the conformation of the capsules 4 in an optimal manner.

The transfer device 13 is also provided with second apertures 15, which enable the differently oriented capsules 4 contained in the compartments 14 to pass therethrough and leave the device. Such an issuance of the capsules 4 can only take place when the second apertures 15, due to the movement of the transfer device 13, come to be situated in a position facing directly a third aperture 17 provided in a stationary base 18. Below this third aperture 17 there is arranged at least an unloading conveyor 19 (FIG. 3) that is adapted to collect one or more capsules 4 and hold them there temporarily until it is required to convey them towards, for instance, a brewing unit (not shown in the Figures). In this way, the conveyance of the capsules 4 occurs in a continuous manner.

When one of said second apertures 15 comes to be situated in a position facing the third aperture 17, this practically creates a gap that extends parallel to the longitudinal axis of the apparatus 1, starting from the blind cavity 6' and up to the unloading conveyor 19. Such a blind cavity 6' ensures that, when the capsules 4 leave the compartments 14, there is a physical separation between the storage chamber 2 and the unloading conveyor 19, so that the capsules 4 still held in the storage chamber 2 will not drop by gravity towards the unloading conveyor 19. For reasons of greater simplicity, in FIGS. 1 and 3 there is illustrated an apparatus 1 that has just a single unloading conveyor 19, as well as a base 18 that is provided with just a single one of said third apertures 17, although it can be readily appreciated by all those skilled in the art that the same apparatus 1 illustrated in FIGS. 1 and 3 may according to the present invention be provided with more than one of said third apertures 17 and more than just a single unloading conveyor 19, depending on the particular needs and circumstances.

Figure 2:
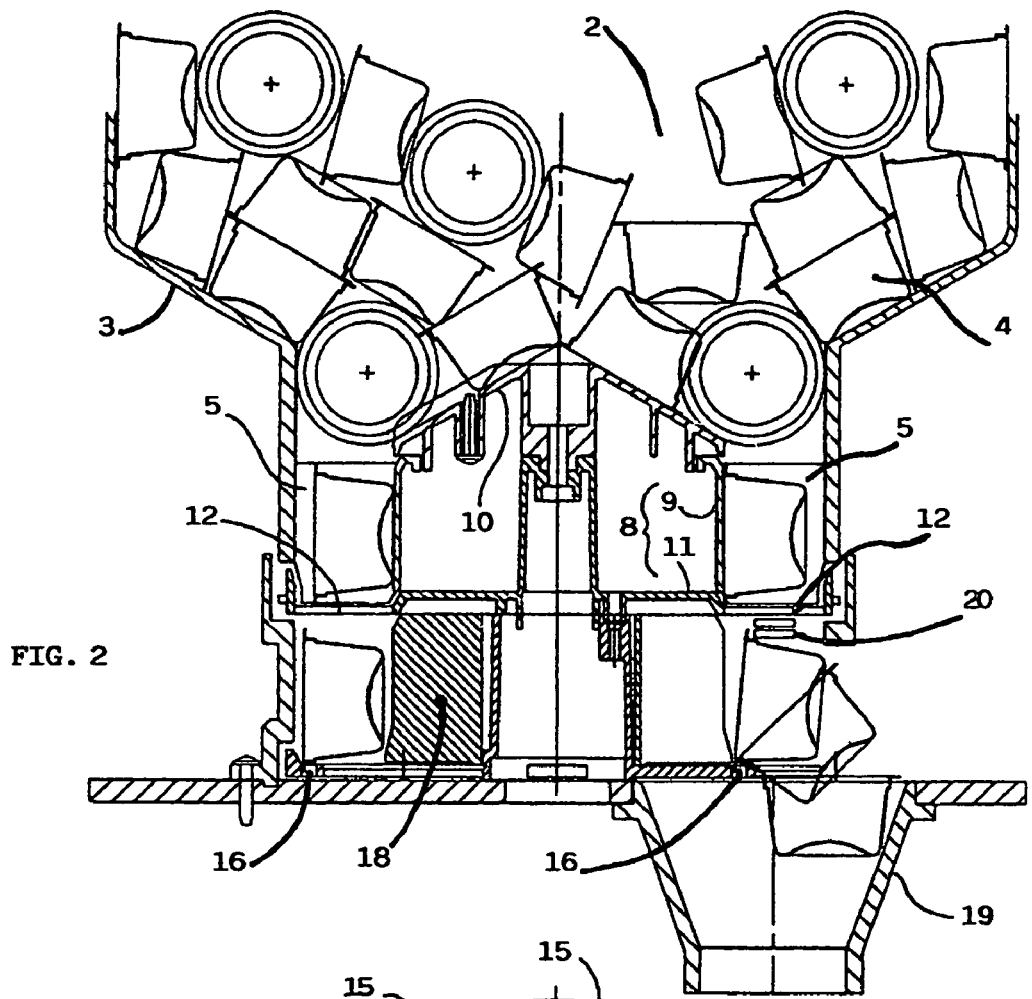
FIG. 2 is a longitudinal sectional view of the apparatus shown in FIG. 1.

Prior to the capsules 4 entering the unloading conveyor 19, a second orientating device 20, which is arranged between the first orientating device 8 and the unloading conveyor 19 itself, is effective in modifying the orientation of the capsules 4 so as to ensure that all of them enter the unloading conveyor 19 according to a same orientation and arrangement, in which the longitudinal axis thereof is substantially vertical. In particular, it is preferable that the upper surface 7 of the capsules 4 is facing upwards. This second orientating device 20 performs such a variation in the orientation of the capsules 4 by taking advantage of the force of gravity. In a preferred manner, the capsules 4 are turned by an angle of approximately 90°. In FIG. 2, which is a longitudinal-sectional view of a first embodiment of the apparatus 1 in the assembled configuration thereof, there can be noticed one of the various possible ways, all of them falling within the scope of the present invention, in which said second orientating device 20 acts to modify the orientation of the capsules 4. When one of the compartments 14 containing a respective one of the capsules 4 reaches a position facing the third aperture 17 owing to the movement performed by the transfer device 13, the second orientating device 20, which is constituted by a snap mechanism in this first embodiment of the apparatus of the invention, raises, as driven by the same movement of the transfer device 13, thereby allowing each individual capsule to tip over due to its own weight. The positions taken by each individual capsule when overturning before reaching the entrance to the unloading conveyor 19 are illustrated in FIG. 2. The stop means 16, further to limiting the movement of the capsules 4 within the compartments 14 as described above, may act as a center of rotation for the capsules being dropped. In this first embodiment of the apparatus 1 of the invention, the variation in the orientation of the capsules 4 takes fully place within the compartments 14, so as to enable the capsules 4 themselves to reach the unloading conveyor 19 with the desired orientation. In the case where more than a single third aperture 17 and more than a single unloading conveyor 19 are provided, it can be readily appreciated that more than a single second orientating device 20 may as well be provided accordingly.

Figure 4:
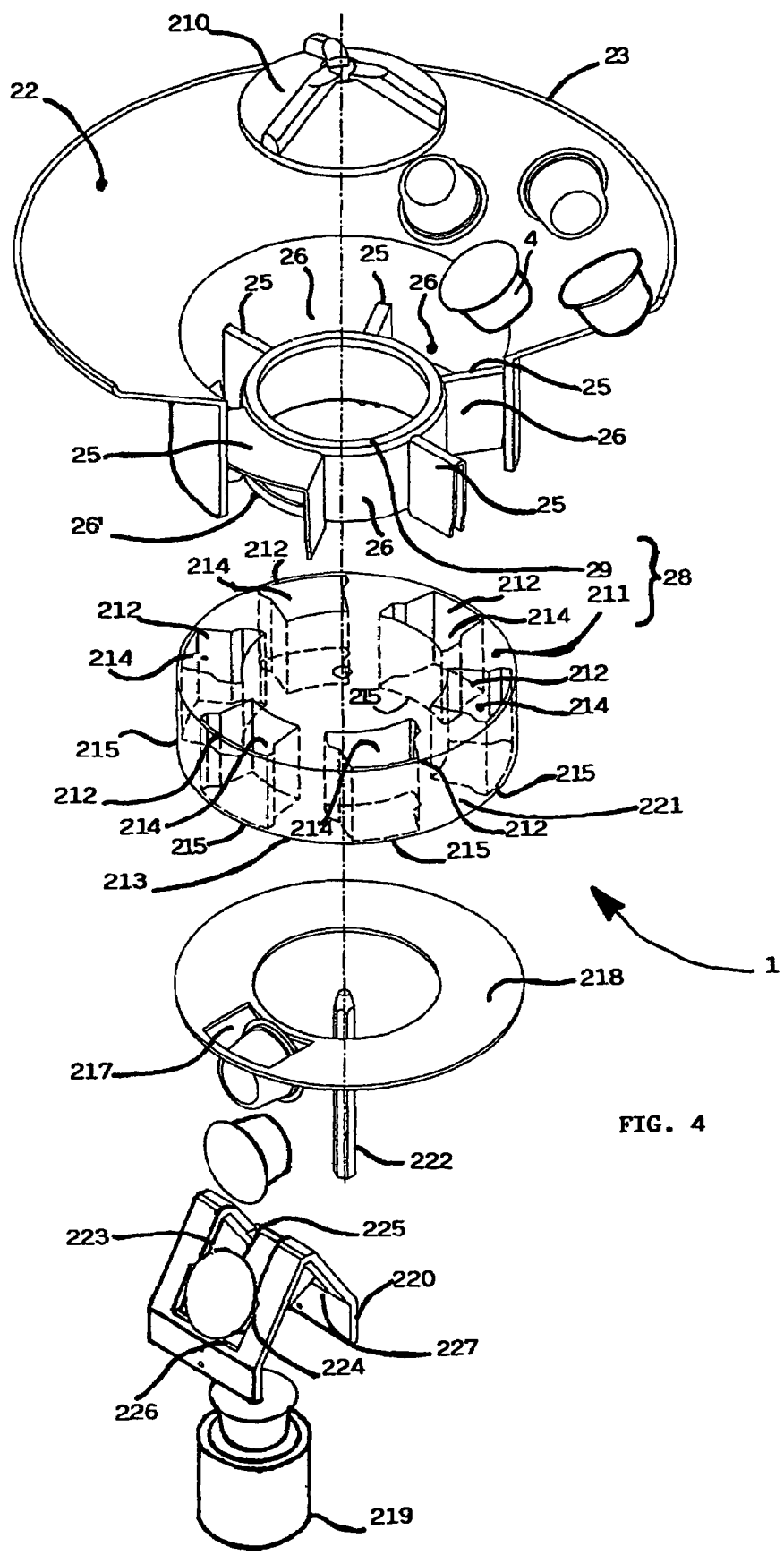
FIG. 4 is a perspective exploded view of a second embodiment of the capsule feeding apparatus for beverage vending machines according to the present invention.

FIG. 4 illustrates a second embodiment of the apparatus 1 for feeding capsules 4 in beverage vending machines according to the present invention. Even in this second embodiment thereof, the apparatus 1 comprises a storage chamber 22 included within conveying means 23 for holding the capsules 4 in a random arrangement. The downward conveyance of the capsules 4 stored in said chamber 22 is facilitated by pick-up means 210 that are preferably driven by an electric motor (not shown) via the shaft 222. The action of such means 210 favors the storage chamber 22 to be emptied in such a manner as to ensure that the capsules 4 that have first been loaded in the chamber are actually the first ones to be conveyed downwards.

Close to the lower portion of the conveying means 23 there is arranged a first orientating device 28, which enables the capsules 4 to be arranged in such a posture as to cause the longitudinal axis thereof to become substantially horizontal. Even in this second embodiment of the apparatus, the first orientating device 28 is constituted by a first member 29 and a second member 211. Said first member 29 is even in this second embodiment advantageously provided with dividing elements 25 defining a plurality of open cavities 26, each one of which is able to accommodate one or more capsules 4. One of these cavities, as indicated at 26' in FIG. 4, is blind and the capsules 4 held in the chamber 22 have no possibility of reaching into it. As far as these dividing elements 25 and the plurality of cavities 26 are concerned, the same considerations apply in this case as the ones that have been previously set forth in connection with the dividing elements 5 and the plurality of cavities 6 of the first embodiment regarding the shapes, the sizing and the interaction thereof with the capsules 4.

In this second embodiment, the first orientating device 28 comprises a second member 211 which is integrated in the transfer device 213 so as to form a single body 221 therewith, which enables the capsules 4 to be not only oriented and organized in the spatial arrangement thereof, but also transferred at the same time. The second member 211 comprises a plurality of first apertures 212 and the transfer device 213 comprises second apertures 215. Between said first and said second apertures 212, 215 there are comprised one or more compartments 214; in particular, each one of said first and said second apertures 212, 215 is situated at the upper and lower extremity of each compartment 214, respectively. The first apertures 212 enable the capsules 4 coming from the cavities 26 to undergo a first orientation, so that the longitudinal axis thereof is brought into a substantially horizontal position, whereas the second apertures 215 enable the capsules 4 to leave, i.e. to be released from the body 221. The body 221 itself is movable with a preferably, although not solely rotary motion about the longitudinal axis of the apparatus 1. In addition, even in this second embodiment, the transfer device 213 and, accordingly, the whole body 221 are preferably driven independently of the pick-up means 210.

Figure 6:
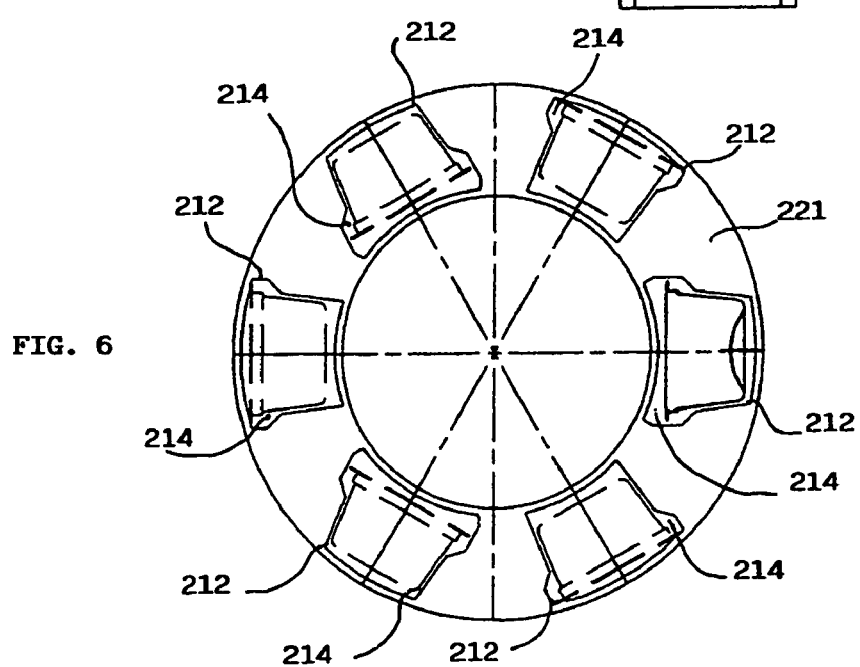
FIG. 6 is a top plan view of the body comprised in the apparatus of FIG. 4, as occupied by the capsules.

The first and the second apertures 212, 215, as well as the compartments 214, have the same characteristics as the ones that have been described previously in connection with the first and the second apertures 12, 15 and the compartments 14 of the first embodiment, as far as the shape, arrangement and interaction thereof with the capsules 4 are concerned. A top plan view of the body 221 as occupied by the capsules 4 is illustrated in FIG. 6.

Similarly to what has been described previously in connection with the first embodiment, in this second embodiment the capsules 4 are only allowed to drop from and leave the body 221 when the second apertures 215 come to be situated, due to the movement of the body 221, in a position facing directly a third aperture 217 provided in a stationary base 218. When the above-cited apertures 215 and 217 come to be situated in a position facing each other, this practically creates a gap that extends parallel to the longitudinal axis of the apparatus 1, starting from the blind cavity 26' and up to the unloading conveyor 219. Such a blind cavity 26' ensures that, when the capsules 4 leave the body 221, there is a physical separation created between the storage chamber 22 and the unloading conveyor 219, so that the capsules 4 still held in the storage chamber 22 will not drop by gravity towards the unloading conveyor 219. Even in this case, a second orientating device 220 is provided to modify the orientation of the capsules 4 so as to ensure that all of them enter the unloading conveyor 219 according to a same orientation and arrangement, in which the longitudinal axis thereof is substantially vertical.

Figure 5:
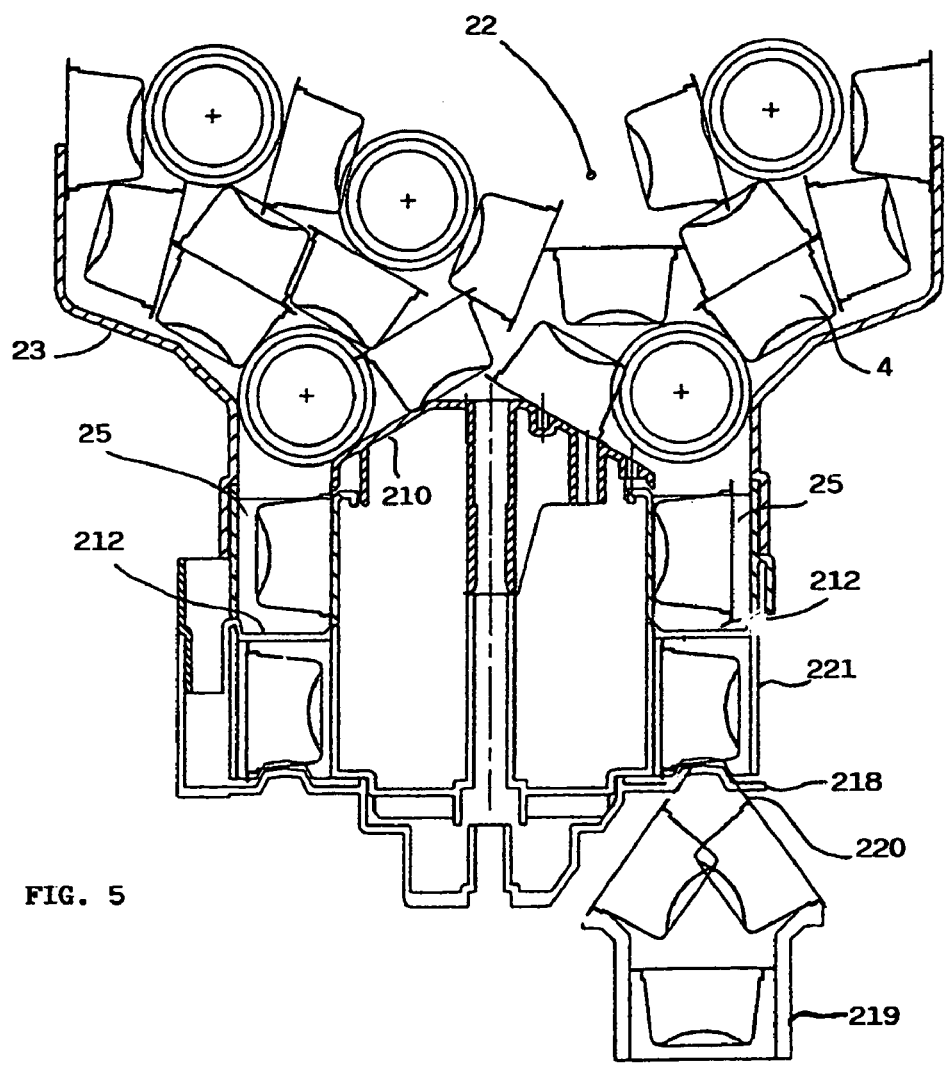
FIG. 5 is a longitudinal sectional view of the apparatus of FIG. 4, as illustrated in the assembled condition thereof.

A longitudinal cross-sectional view of the second embodiment of the apparatus 1 in the assembled configuration thereof is shown in FIG. 5.

Figure 7:
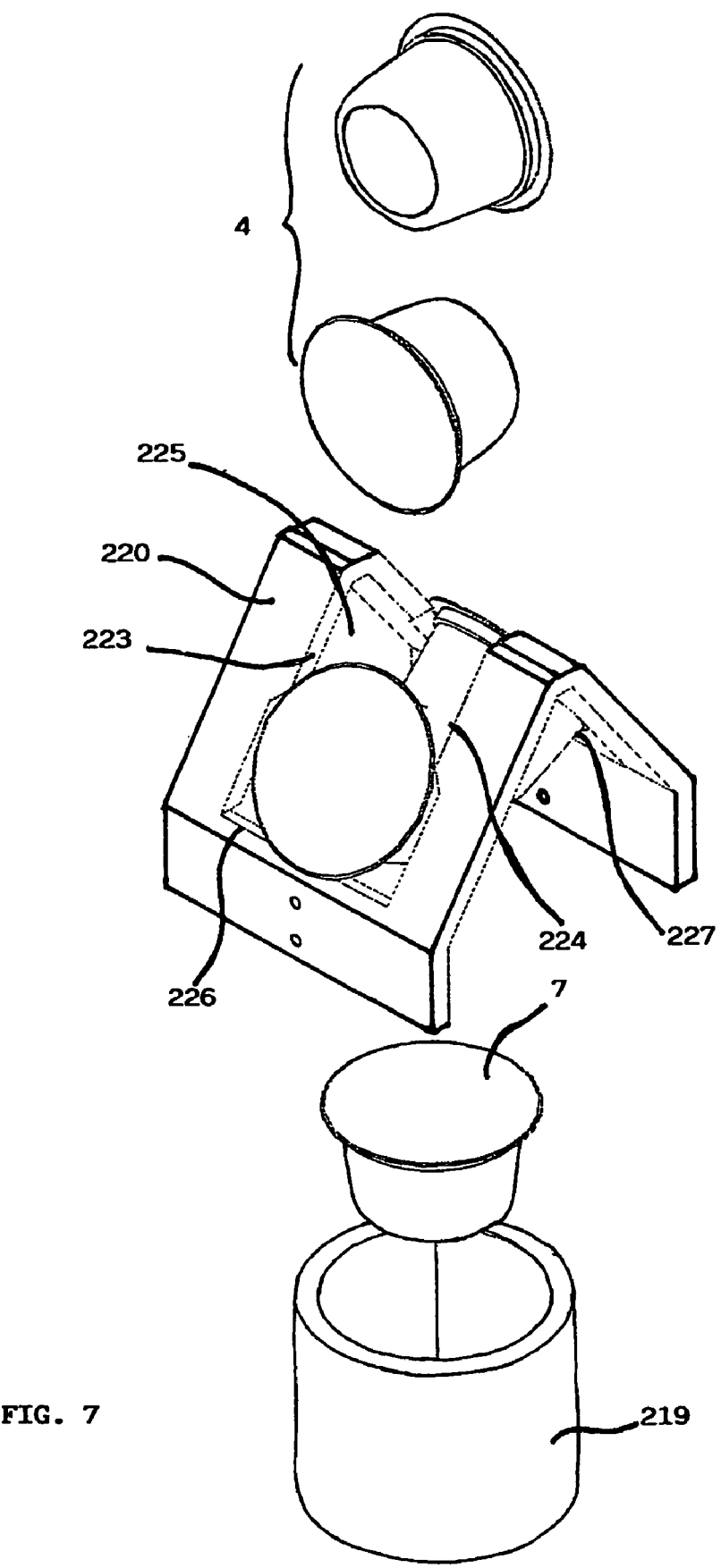
FIG. 7 is a perspective view of a second embodiment of the second orientation device used in the apparatus of FIG. 4, as occupied by capsules oriented in opposite directions.

Due to the particular conformation thereof, the second orientating device 220, which is situated between the first orientating device 28 and the unloading conveyor 219 itself, is capable of modifying the natural trajectory that the capsule 4 follow in dropping freely by the effect of the force of gravity. A possible configuration of this second orientating device 220 is best illustrated in FIG. 7, in which it can be noticed that it is constituted by a pair of guide profiles 223, 224 that are engaged by a portion of the capsules 4. These profiles 223 and 224 diverge away symmetrically in two directions, thereby defining a prism-shaped structure having an approximately triangular cross-section, as well as a slot-like aperture 225 in which the capsules 4 are able to slide. This slot-like aperture 225 widens out symmetrically at its end portions 226 and 227, so that the capsules 4, when encountering said end portions 226 and 227 in their descending trajectory, eventually find a point or a surface about which they are able to rotate, thereby varying their orientation by an angle of approximately 90° and providing in this way, at the entrance to the unloading conveyor 219, capsules that are preferably oriented with their upper surface 7 facing upwards.

The directions in which said guide profile 223 and 224 diverge are such as to enable the capsules 4 reaching the second orientation device 220 with mutually differing orientations to be oriented in a single and same direction. FIG. 7 illustrates the various phases which the differently oriented capsules 4 go through to change their orientation.

Even in the case of this second embodiment of the apparatus 1 of the present invention, where more than a single third aperture 217 and more than a single unloading conveyor 219 are provided, it can be readily appreciated that more than a single second orientating device 220 may as well be provided accordingly.

Fully apparent from the above description is therefore the ability of the present invention to effectively reach the afore cited aims and advantages by providing a capsule feeding apparatus for beverage vending machines, which is such as to enable capsules to be picked up, conveyed and oriented automatically, which have been stored in a compartment loosely, i.e. in no pre-established order, wherein no particular operations are actually required for pre-orienting said capsules when loaded in the storage chamber. Fully apparent is also the fact that the apparatus according to the present invention is capable of picking up, conveying and orienting the capsules by taking advantage of the force of gravity, while requiring just a small space to perform these tasks thereof, the apparatus itself being of an extremely compact size and taking up just a little space in the vending machine. Fully apparent from the above description is finally the ability of the apparatus according to the present invention to enable capsules to be withdrawn in a discontinuous manner from the storage chamber and to be then conveyed in a continuous manner, and with a pre-established orientation, towards at least an unloading conveyor, wherein said same apparatus does not give rise to any kind of errors in the orientation of the capsules.

It should be noticed that the materials used, as well as the shapes and the sizing of the individual items of the apparatus of the invention, may each time be selected so as to more appropriately meet the particular requirements or suit the particular application.

The various items and parts entering the construction of the apparatus of the present invention shall of course not be embodied strictly and solely in the manner that has been described and illustrated above, but can rather be implemented in a number of different embodiments, all of which falling within the scope of the present invention. So, for instance, the apparatus may include an electronic control system of any kind known as such, which would constantly monitor it for correct operation by detecting, for example, early jamming situations and/or non-consistent capsules. In the same way, the apparatus according to the present invention may include electronic systems to govern the movement and/or the correct interaction of the various parts making up the same apparatus.

The invention claimed is:

1. An apparatus for feeding capsules in beverage vending machines, said apparatus comprising:
    a storage chamber adapted to hold the capsules in a random arrangement;
    pick-up means for picking up the capsules;
    a capsule transfer device provided with one or more compartments for the capsules;
    at least one unloading conveyor for unloading the capsules;
    wherein, between said storage chamber and said at least one unloading conveyor, said apparatus comprises:
    a first orientating device adapted to orientate the capsules according to at least a substantially horizontal-axis position; and
    a second orientating device adapted to arrange the capsules according to a substantially vertical-axis position,
    wherein one of said first and second orientating devices comprises at least a portion which is movable relative to the other of said first and second orientating devices, and
    wherein said first orientating device comprises:
    a first member provided with a plurality of dividing elements defining a plurality of open cavities, each of the plurality of open cavities being capable of accommodating one or more of the capsules; and
    a second member comprising a plurality of first apertures arranged in a position facing said one or more compartments.

2. An apparatus for feeding capsules in beverage vending machines according to claim 1, wherein said first orientating device is provided close to a lower portion of said storage chamber.

3. An apparatus for feeding capsules in beverage vending machines according to claim 1, wherein said first apertures replicate a peripheral contour of at least a section of the capsules.

4. An apparatus for feeding capsules in beverage vending machines according to claim 1, wherein said plurality of open cavities are adapted to accommodate said one or more of the capsules arranged in a number of orientations that is equal to the number of peripheral contours replicated by said first apertures.

5. An apparatus for feeding capsules in beverage vending machines according to claim 1, wherein said first apertures are arranged alternately with a first orientation and a second orientation, the first orientation being different than the second orientation.

6. An apparatus for feeding capsules in beverage vending machines according to claim 1, wherein said second member and said transfer device move with a synchronous rotary motion.

7. An apparatus for feeding capsules in beverage vending machines according to claim 1, wherein said second member and said transfer device are each constituted by a plate in a substantially circular shape.

8. An apparatus for feeding capsules in beverage vending machines according to claim 1, wherein said second member is able to select more than one of the capsules at the same time.

9. An apparatus for feeding capsules in beverage vending machines according to claim 1, wherein said transfer device comprises one or more second apertures.

10. An apparatus for feeding capsules in beverage vending machines according to claim 1, wherein said pick-up means and said transfer device are driven independently of each other.

11. An apparatus for feeding capsules in beverage vending machines according to claim 1, further comprising a stationary base provided with at least a third aperture situated in a position facing said at least one unloading conveyor.

12. An apparatus for feeding capsules in beverage vending machines according to claim 1, wherein said second orientating device causes the capsules to rotate by an angle of approximately 90°.

13. An apparatus for feeding capsules in beverage vending machines according to claim 12, wherein said rotation of the capsules takes place within at least one of said one or more compartments of said transfer device.

14. An apparatus for feeding capsules in beverage vending machines according to claim 1, wherein said second orientating device is constituted by a snap-acting mechanism.

15. An apparatus for feeding capsules in beverage vending machines according to claim 1, wherein said one or more compartments for accommodating the capsules comprise stop means adapted to limit the movement of the capsules.

16. An apparatus for feeding capsules in beverage vending machines according to claim 15, wherein said stop means acts as the center of rotation of the capsules.

17. An apparatus for feeding capsules in beverage vending machines according to claim 1, wherein said second orientating device is actuated by movement of said transfer device.

18. An apparatus for feeding capsules in beverage vending machines according to claim 1, wherein said second member and said transfer device form a single body.

19. An apparatus for feeding capsules in beverage vending machines according to claim 1, wherein said second orientating device interacts with at least one of the capsules to modify a natural falling trajectory thereof as determined by the force of gravity.

20. An apparatus for feeding capsules in beverage vending machines according to claim 1, wherein said second orientating device is constituted by a pair of guide profiles that are engaged by a portion of the capsules.

21. An apparatus for feeding capsules in beverage vending machines according to claim 20, wherein said pair of guide profiles define a slot-like aperture.

22. An apparatus for feeding capsules in beverage vending machines according to claim 20, wherein said pair of guide profiles diverge away symmetrically in two directions, thereby defining a prism-shaped structure having an approximately triangular cross-section.

* * * * *